June 23, 1970   A. L. FREEDLANDER ET AL   3,516,236

MOWER BLADE

Original Filed Dec. 11, 1967

INVENTORS
ABRAHAM L. FREEDLANDER
ROBERT E. MATTHEWS
WAYNE C. GARRETT
BY
Reuben Wolk
ATTORNEY

3,516,236
MOWER BLADE

Abraham L. Freedlander, Dayton, Ohio, and Robert E. Matthews and Wayne C. Garrett, Waynesville, N.C., assignors to Dayco Corporation, Dayton, Ohio, a corporation of Delaware
Continuation of application Ser. No. 689,651, Dec. 11, 1967. This application Nov. 25, 1968, Ser. No. 778,866
Int. Cl. A01d 55/18
U.S. Cl. 56—295                        5 Claims

ABSTRACT OF THE DISCLOSURE

A flexible mower blade adaptable for mounting on a power driven rotary lawn mower and designed for improved safety. The blade is primarily formed of an elastomeric material such as urethane but has a rigid metal or plastic central mounting plate bonded within the blade for mounting to the lawn mower shaft. The plate has tapered edges to combine rigidity with flexibility.

---

This application is a continuation of patent application No. 689,651, now abandoned.

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. This invention utilizes a blade having arms somewhat similar to those of a metal blade, but made of an elastomeric material that is sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and very low in cost.

In our Pat. No. 3,343,350 we have described a blade made entirely of a urethane elastomer. Our copending application Ser. No. 625,802, now abandoned, but filed as a continuation under application Ser. No. 816,166, represented an improvement over our patent in that it provided a central rigid mounting plate embedded within the elastomer for mounting the blade upon the drive shaft, thus eliminating the need for separate mounting members which are usually required with lawn mowers. The use of this plate eliminates the possibility of the separate members becoming lost, avoids sharp exposed metal edges which are found in conventional adapters, and simplifies installation. The present application represents an improved form of this mounting plate in which all the earlier advantages are retained, but in addition the edges of the plate are tapered to give them increased flexibility. By retaining full thickness in the center of the plate, the necessary mounting rigidity is maintained, but the tapered edges enhance the ability of the blade to flex and ride over obstacles.

The specific embodiments of the invention are described in the following specification and claims, and illustrated in the drawings, in which:

Figure 1:
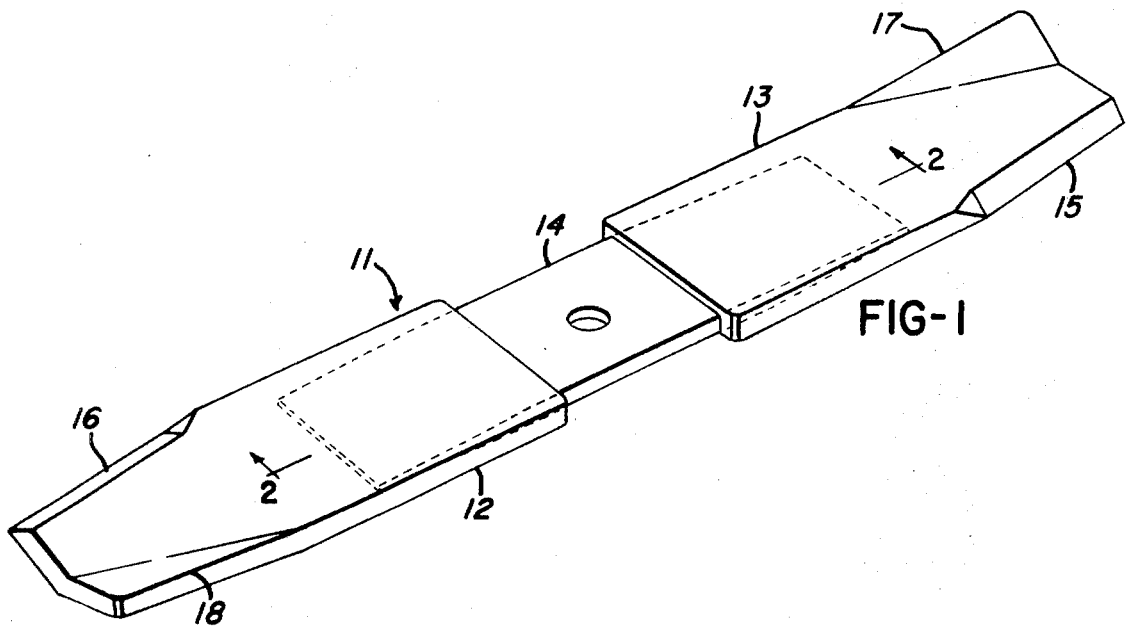
FIG. 1 is a perspective view of a novel blade.
Figure 2:
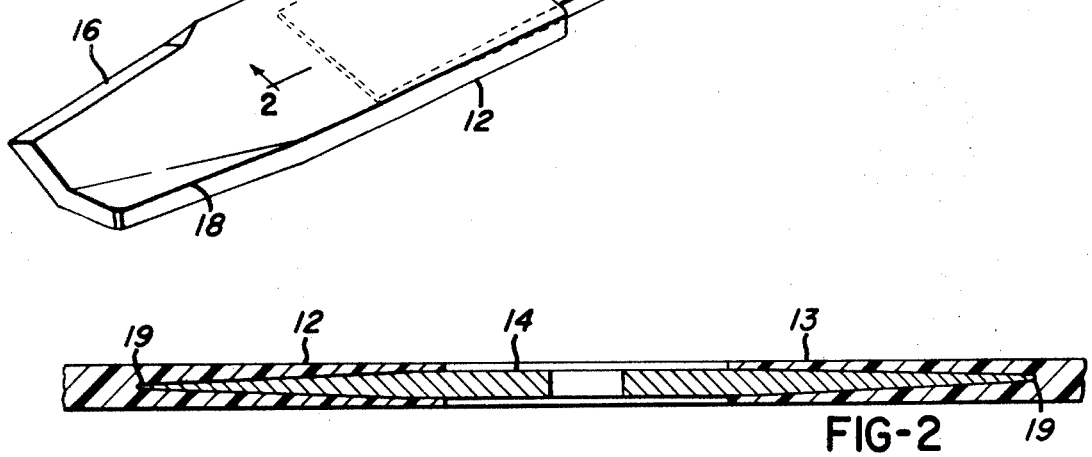
FIG. 2 is a cross-sectional view of the blade taken along lines 2—2 of FIG. 1.

Referring to the drawings, FIG. 1 illustrates a lawn mower blade 11 which is generally flat and rectangular and formed of two body portions 12 and 13 having cutting edges 15 and 16 at the extremities thereof. These portions are made of a urethane elastomer such as more fully described in Pat. No. 3,343,350 referred to above, and are preferably of the type which may be molded or cast and formulated from a polyester or polyether based isocyanate terminated prepolymer. Opposite the cutting edges are upwardly angled sections 17 and 18. Mounted within the central portion of the blade is a rigid plate 14 which may be made of a metal or of a rigid plastic material such as nylon, polycarbonate, polystyrene, or the like. The plate is imbedded within portions 12 and 13, but is exposed at the center to form a central mounting member. An aperture in the center of the plate permits mounting on the shaft of a lawn mower. The plate 14 has its maximum thickness throughout the exposed center, and for a short distance outwardly therefrom, but the outer ends thereof are taperd in a horizontal plane to their thinnest sections 19, as shown in FIG. 2. Stated another way, the plate becomes thinner at its outer extremities. The exact dimensions of the plate may be varied somewhat, but may range from ⅜₁₆ inch in thickness at its center to ¹⁄₁₆ inch in thickness at the extremities. The plate will thus provide mounting rigidity at the center, but will provide increased flexibilty at the outer extremties. Since the purpose of the blade is to flex or give upon impact with a shoe or rock, this tendency is enhanced by the design described herein.

Figure 3:
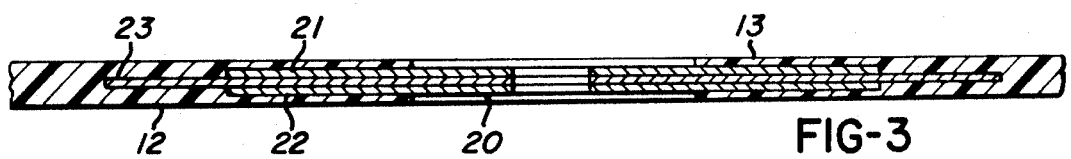
FIG. 3 is a view similar to FIG. 2 illustrating a modified form of the blade.

FIG. 3 illustrates a further form of the invention in which the same result may be obtained by utilizing a center plate 20 which consists of laminar members 21, 22, and 23 each about 1/16 inch thick. The outer members 21 and 22 extend a short distance into the elastomeric portions 12 and 13, while the center member 23 extends outwardly of the other portions, thus creating additional flexibility in the same manner as tapered edges 19. The members may be assembled by conventional methods; for example, if the members are made of metal, spotwelding may be used; if plastic, cementing or riveting may be used.

Other modifications are specifically contemplated as being within the scope of the invention.

We claim:

1. In a lawn mower having a rotatable shaft and a cutting blade mounted thereon, said blade including outwardly extending arms having cutting edges of a urethane elastomer at the outer ends thereof, and a rigid central mounting plate extending outwardly into said arms and terminating inwardly of said cutting edges, said outer ends being flexible with respect to said plate, said plate being tapered in a horizontal plane from a maximum thickness at its center to a minimum thickness at its outer extremities.

2. The blade of claim 1 in which said plate is metal.
3. The blade of claim 1 in which said plate is plastic.
4. The blade of claim 1 in which said plate is comprised of a plurality of laminar members.
5. The blade of claim 1 in which said plate is comprised of at least three laminar members, the middle member extending farther into said arms than said other members.

References Cited

UNITED STATES PATENTS

| 1,686,069 | 10/1928 | Bucklen | 170—159 |
| 2,473,665 | 6/1949 | Van Nort | 170—159 |
| 2,621,140 | 12/1952 | Bitterli et al. | 170—159 |
| 3,133,398 | 5/1964 | Tatum | 56—295 |
| 3,156,082 | 11/1964 | Joyner | 56—295 |
| 3,320,732 | 5/1967 | Kirk | 56—295 |

ROBERT PESHOCK, Primary Examiner

J. A. OLIFF, Assistant Examiner